United States Patent [19]

Robinson

[11] Patent Number: 4,476,293

[45] Date of Patent: Oct. 9, 1984

[54] POLYMERIC CARBONATE DIOLS OF COPOLYETHER GLYCOLS AND POLYURETHANES PREPARED THEREFROM

[75] Inventor: Ivan M. Robinson, Wilmington, Del.

[73] Assignee: E. I. Du Pont de Nemours and Company, Wilmington, Del.

[21] Appl. No.: 460,569

[22] Filed: Jan. 24, 1983

Related U.S. Application Data

[63] Continuation of Ser. No. 326,043, Nov. 30, 1981, abandoned.

[51] Int. Cl.³ .................. C08G 18/44; C08G 18/48
[52] U.S. Cl. .................................. 528/76; 260/463; 525/467; 528/78; 528/372
[58] Field of Search .............. 528/372, 417, 76, 77; 525/467; 260/463

[56] References Cited

U.S. PATENT DOCUMENTS

| | | | |
|---|---|---|---|
| 3,544,524 | 12/1970 | Müller et al. | 525/467 |
| 4,131,731 | 12/1978 | Lai et al. | 525/467 |
| 4,217,437 | 8/1980 | Schreckenberg et al. | 528/171 |
| 4,251,654 | 2/1981 | Robinson et al. | 528/417 |
| 4,264,752 | 4/1981 | Watson, Jr. | 525/467 |

OTHER PUBLICATIONS

W. H. Carothers and F. J. Van Natta, J.A.C.S., 52, (1930), pp. 314–326.

*Primary Examiner*—Theodore E. Pertilla

[57] ABSTRACT

Polymeric carbonate diols are prepared by coupling segments of copolyether glycols with a dialkyl carbonate, with a cyclic carbonate, or with phosgene.

The carbonate diols are useful in preparing polyurethanes.

4 Claims, No Drawings

POLYMERIC CARBONATE DIOLS OF COPOLYETHER GLYCOLS AND POLYURETHANES PREPARED THEREFROM

This is a continuation, of application Ser. No. 326,043, filed Nov. 30, 1981 abandoned.

DESCRIPTION

Technical Field

This invention relates to polymeric carbonate diols of copolyether glycols. It also relates to polyurethanes made with these polyether carbonate diols.

SUMMARY OF THE INVENTION

The polyether carbonate diols of the invention are made by coupling copolyether glycol segments with a dialkyl carbonate, with a cyclic carbonate or with phosgene.

The polyurethanes are made by reacting a polyether carbonate diol with a conventional isocyanate to form a prepolymer, and then reacting a prepolymer with a conventional polyol or polyamine chain extender.

DETAILED DESCRIPTION OF THE INVENTION

The copolyether glycol starting material is one based on tetrahydrofuran (THF) and an alkylene oxide (AO), and is sometimes also referred to as a copolymer of THF and an AO. "AO" as used herein, means an alkylene oxide whose ring contains two or three carbon atoms. The AO can be unsubstituted or substituted with, for example, alkyl groups or halogen atoms. Illustrative alkylene oxides are ethylene oxide (EO), 1,2-propylene oxide (PO), 1,3-propylene oxide, 1,2-butylene oxide, 1,3-butylene oxide, 2,2'-bischloromethyl-1,3-propylene oxide and epichlorohydrin. The copolymers preferred for use are those of THF and EO and THF and PO. The copolymer can also be of THF and two or more alkylene oxides, as for example a THF/EO/PO copolymer.

The copolymer may have
(1) 10-80%, by weight, of AO units, preferably 20-60%, even more preferably 30-55%; and
(2) hydroxyl functionalities of 2.0-4.0, preferably 2.0-2.5.

The copolyether glycol starting material may be of any practical molecular weight, but will preferably have a number average molecular weight of 600-3000, even more preferably 1000-2000. Number average molecular weight is determined by first determining the hydroxyl number of the sample by titrating it with acetic anhydride according to ASTM-D-1638 and then converting this number to number average molecular weight according to the formula $$\text{Molecular weight} = \frac{56,000 \times n}{\text{hydroxyl number}}$$

where n is the hydroxyl functionality of the sample.

The copolyether glycol can be produced by any of the known methods. Illustrative of such methods are those shown in British Pat. No. 854,958 and U.S. Pat. No. 4,127,513. The disclosures of those documents are incorporated into this application to show how such copolymers are prepared.

The dialkyl carbonate coupling agents which can be used are those whose alkyl groups contain 1-4 carbon atoms. Dimethyl- and diethyl carbonate are preferred. The cyclic carbonate coupling agents are those whose rings contain 2 or 3 carbon atoms. The coupling agent, whether it be a dialkyl carbonate, a cyclic carbonate or phosgene, can be of any customary grade available in the marketplace.

The amounts of copolyether glycol and coupling agent used are of course governed by the molecular weight desired in the product, and will be such that one mole more of the copolyether glycol will be used than of coupling agent. When the coupling agent is a dialkyl carbonate or a cyclic carbonate, some of it may be removed from the reaction mass along with byproduct alcohol. This loss should be compensated for.

The catalyst used can be any of the conventional ester interchange catalysts. Tetrabutyl titanate is preferred. The catalyst may be employed at a concentration of 0.0001-0.1%, by weight, of the reaction mass.

The reaction can be carried out in bulk, using the copolyether glycol itself as the reaction medium. When a dialkyl carbonate or a cyclic carbonate is used as the coupling agent, the carbonate and the catalyst are added directly to the medium. The reaction can be carried out at a temperature of 120°-240° C. and at atmospheric pressure. Byproduct alcohol can be removed from the reaction mass by vaporization or by sweeping the reaction zone with nitrogen.

When a polymeric carbonate diol having the desired molecular weight has been obtained, as determined by periodic sampling and analysis, the volatiles are stripped from the reaction mass under vacuum and the reaction is then complete.

When phosgene is used as the coupling agent, the reaction is conducted in basically the same way, varying only in that lower reaction temperatures are used, viz., 0°-150° C., and a base acceptor is added to the reaction mass to neutralize the byproduct hydrochloric acid.

Any number of copolyether glycol segments can be coupled in this manner. The simplest polymeric carbonate diol is of course that formed by coupling two glycol segments. The upper limit of the number of segments which can be coupled is a practical one: beyond a certain range, the viscosity of the product makes preparation self-limiting. Most commercial and industrial applications will require a carbonate diol with a number average molecular weight in the range 1200-12,000, more preferably 2000-5000.

A polyurethane can be prepared from such an polymeric carbonate diol by reacting it with an organic polyisocyanate and an aliphatic polyol or polyamine chain extender, as is well known in the art.

The polyisocyanates used in preparing the polyurethanes can be any of the aliphatic or aromatic polyisocyanates ordinarily used to prepare polyurethanes. Illustrative are
2,4-toluene diisocyanate
2,6-toluene diisocyanate
hexamethylene-1,6-diisocyanate
tetramethylene-1,4-diisocyanate
cyclohexane-1,4-diisocyanate
naphthalene-1,5-diisocyanate
diphenylmethane-4,4'-diisocyanate
xylylene diisocyanate
hexahydro xylylene diisocyanate
dicyclohexylmethane-4,4'-diisocyanate
1,4-benzene diisocyanate 3,3'-dimethoxy-4,4'-diphenyl diisocyanate
m-phenylene diisocyanate
isophorone diisocyanate
polymethylene polyphenyl isocyanate
4,4'-biphenylene diisocyanate
4-isocyanatocyclohexyl-4'-isocyanatophenyl methane
p-isocyanatomethyl phenyl isocyanate.
Mixtures of isocyanates can also be used.

The isocyanates preferred for use because of the desirable properties they confer on the polyurethane products are diphenylmethane-4,4'-diisocyanate and the toluene diisocyanates.

The chain extenders used in preparing the polyurethanes can be any of the aliphatic polyols or any of the aliphatic or aromatic polyamines ordinarily used to prepare polyurethanes.

Illustrative of the aliphatic polyols which can be used as chain extenders are
1,4-butanediol
ethylene glycol
1,6-hexanediol
glycerine
trimethylolpropane
pentaerythritol
1,4-cyclohexane dimethanol
phenyl diethanolamine.
Diols like hydroquinone bis($\beta$-hydroxyethyl)ether, tetrachlorohydroquinone-1,4-bus($\beta$-hydroxyethyl)ether and tetrachlorohydroquinone-1,4-bis($\beta$-hydroxyethyl)-sulfide, even though they contain aromatic rings, are considered to be aliphatic polyols for purposes of the invention.

Aliphatic diols of 2-10 carbon atoms are preferred. Especially preferred is 1,4-butanediol. Mixtures of diols can also be used.

Illustrative of the polyamines which can be used as chain extenders are:
p,p'-methylene dianiline and complexes thereof with alkali metal chlorides, bromides, iodides, nitrites and nitrates
4,4'-methylene bis(2-chloroaniline)
dichlorobenzidine
piperazine
2-methylpiperazine
oxydianiline
hydrazine
ethylenediamine
hexamethylenediamine
xylylenediamine
bis(p-aminocyclohexyl)methane
dimethyl ester of 4,4'-methylenedianthranilic acid
p-phenylenediamine
m-phenylenediamine
4,4'-methylene bis(2-methoxyaniline)
4,4'-methylene bis(N-methylaniline)
2,4-toluenediamine
2,6-toluenediamine
benzidine
3,4'-dimethylbenzidine
3,3'-dimethoxybenzidine
dianisidine
1,3-propanediol bis(p-aminobenzoate)
isophorone diamine
1,2-bis(2'-aminophenylthio)ethane
3,5-diethyl toluene-2,4-diamine
3,5-diethyl toluene-2,6-diamine.
Mixtures of amines can also be used.

The amines preferred for use are 4,4'-methylene bis(2-chloroaniline), 1,3-propanediol bis(p-aminobenzoate), and p,p'-methylenedianiline and complexes thereof with alkali metal chlorides, bromides, iodides, nitrites and nitrates. Mixtures of amines can also be used.

The polyurethanes can be prepared in two steps, the first of which is conducted under nitrogen at ambient pressure to prevent oxidation of the reactants and product, and to prevent exposure of the reaction mass to atmospheric moisture. In the first step, the polymeric carbonate diol starting material is dried by heating it at a temperature of 80°-100° C. under vacuum, and is then held at 60°-125° C., preferably about 70°-90° C., while a stoichiometric excess, preferably twofold to tenfold, of organic diisocyanate is added, with stirring. The actual amount of isocyanate used depends on the molecular weight of the polymeric carbonate diol, as is well known in the art. The reaction mass is held for about 1-4 hours at 60°-125° C., with stirring, and the free isocyanate content of the mass is then determined by titrating it with di-n-butylamine, as described in Analytic Chemistry of the Polyurethanes, Volume XVI, Part III, D. J. David and H. B. Staley, Wiley-Interscience, 1969, pages 357-359.

In the second step, an amount of polyamine or polyol chain extender calculated to give an isocyanate/hydroxyl or amine mole ratio of about 0.9-1.1/1 in the reaction mass, preferably 1-1.05/1, is added to the reaction mass.

A conventional curing catalyst can be added at this point if desired. Illustrative of catalysts which can be used are dibutyltin dilaurate and stannous octoate. The catalyst can be added to the reaction mass to give a concentration of about 0.001-0.1%, by weight, preferably about 0.01%.

The reaction mass is held with stirring at 60°-130° C. until it is homogeneous, which normally takes 1-5 minutes. The mass is then poured into molds, preferably preheated to 100°-120° C., and then cured at about 100°-120° C. at a pressure of 1700-2500 kPa for from 5 minutes to several hours. The casting is then cooled, removed from the mold, aged for about one week at ambient temperature, and is then ready for use.

EXAMPLES

In the following examples, all parts are by weight.

EXAMPLE 1—Best Mode

A reaction vessel was charged with

| | |
|---|---|
| THF/EO copolymer (63/37) molecular weight 1000 | 300 parts |
| Diethyl carbonate | 24 parts |
| Tetrabutyl titanate | 0.1 part |

The resulting mixture was heated to and held at 200°-235° C., with stirring, for two hours, during which period ethanol was removed from the mixture by distillation. At the end of two hours, another 1.8 parts of diethyl carbonate were added to the mixture.

The mixture was then held at 235° C., with stirring, for one hour and was then held under vacuum for 3.5 hours to strip off volatiles.

The resulting polymeric carbonate diol had a number average molecular weight of 2736.

EXAMPLE 2

(A) The product of Example 1, 14.34 parts, was charged to a polymerization kettle and dried by heating it at 85° C. for one hour at a pressure of 2000 Pa.

The dried product was then held at 85° C. while 47 parts of molten diphenylmethane-4,4'-diisocyanate were added thereto. The kettle was then purged with nitrogen and the reaction mass held at 85° C. for two hours, with stirring, to give a product with a free isocyanate content of 7.49%.

This product, 152.07 parts, was then heated at 85° C. for one hour at a pressure of 2000 Pa.

(B) 1,4-Butanediol, 11.62 parts, preheated to 60°-65° C., was added, with stirring, to the product of (A) held at 85° C. This reaction mixture was then held at 85° C., with stirring, for 4 minutes.

The mixture was then poured into a mold preheated to 110° C., which was then pressed in a platen press at 110° C. and a platen pressure of 2155 kPa for 17 hours. The resulting elastomeric material was held for one week at ambient temperature and was then ready for use.

I claim:

1. A polymeric carbonate diol made by coupling segments of a tetrahydrofuran/alkylene oxide copolymer with a dialkyl carbonate whose alkyl group contains 1–4 carbon atoms or phosgene, the diol having a number average molecular weight of 1200–12,000, as determined by hydroxyl number.

2. The carbonate diol of claim 1 in which the alkylene oxide is ethylene oxide or a propylene oxide.

3. A polyurethane which is the reaction product of
   (a) a polymeric carbonate diol of claim 1,
   (b) an organic polyisocyanate, and
   (c) a chain extender which is an aliphatic polyol or polyamine.

4. A polyurethane which is the reaction product of
   (a) a polymeric carbonate diol of claim 2,
   (b) an organic polyisocyanate, and
   (c) a chain extender which is an aliphatic polyol or polyamine.

* * * * *